(12) United States Patent
Sasaki

(10) Patent No.: US 9,739,236 B2
(45) Date of Patent: Aug. 22, 2017

(54) CHECK VALVE

(71) Applicant: ZAMA JAPAN KABUSHIKI KAISHA, Iwate (JP)

(72) Inventor: Hideki Sasaki, Iwate (JP)

(73) Assignee: ZAMA JAPAN KABUSHIKI KAISHA, Iwate (JP)

( * ) Notice: Subject to any disclaimer, the term of this patent is extended or adjusted under 35 U.S.C. 154(b) by 3 days.

(21) Appl. No.: 14/803,522

(22) Filed: Jul. 20, 2015

(65) Prior Publication Data

US 2016/0040791 A1    Feb. 11, 2016

(30) Foreign Application Priority Data

Aug. 7, 2014   (JP) ................. 2014-161420

(51) Int. Cl.
    *F16K 15/02*    (2006.01)
    *F02M 17/14*    (2006.01)
    *F16K 27/02*    (2006.01)
    *F02M 17/32*    (2006.01)

(52) U.S. Cl.
    CPC .......... *F02M 17/145* (2013.01); *F02M 17/32* (2013.01); *F16K 15/023* (2013.01); *F16K 27/0209* (2013.01)

(58) Field of Classification Search
    CPC ........................ F16K 15/023; F16K 27/0209

USPC ................. 137/517, 519, 532, 533
See application file for complete search history.

(56) References Cited

U.S. PATENT DOCUMENTS 2,413,653 A * 12/1946 Rataiczak ............ F25B 31/026
                                          137/533
4,637,430 A     1/1987  Scheffel et al.
4,907,616 A * 3/1990  Bergsma ............... F16K 15/023
                                           137/38

FOREIGN PATENT DOCUMENTS

JP        10-288265      10/1998
JP        2010-60110      3/2010

\* cited by examiner

*Primary Examiner* — Craig Schneider
*Assistant Examiner* — P. Macade Nichols
(74) *Attorney, Agent, or Firm* — One LLP

(57) ABSTRACT

A check valve that can prevent sticking of a valve body and reliably perform an opening and closing action in a check vale having a simple structure and that does not use biasing means on the valve body. A check valve has support pieces of a valve body protruding in the valve body direction on a circular base seat forming an outflow window in the center inserted in a circular groove where a support member (retainer) is formed between an outflow opening and a valve seat and on an open edge of the outflow window formed in the center of the base seat, and the support pieces of the support member (retainer) that support the valve body have linear or planar support parts on the top portion for leveling at least in a radial direction of the base seat.

3 Claims, 4 Drawing Sheets

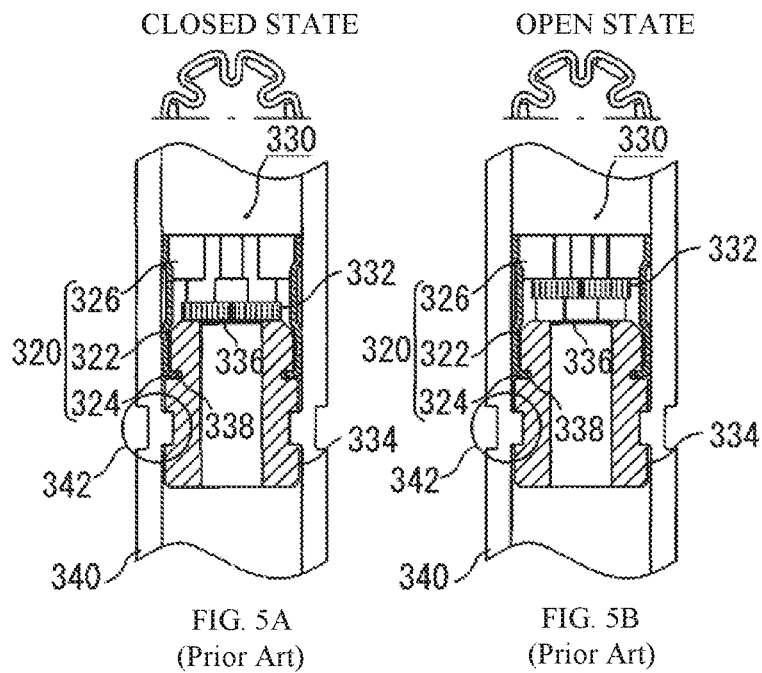
FIG. 5A (Prior Art)  FIG. 5B (Prior Art)
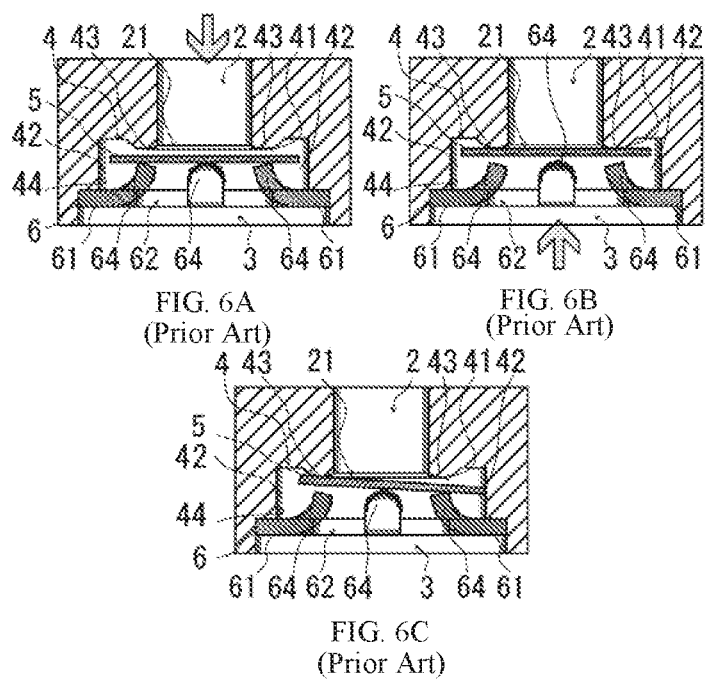
FIG. 6A (Prior Art)  FIG. 6B (Prior Art)
FIG. 6C (Prior Art)

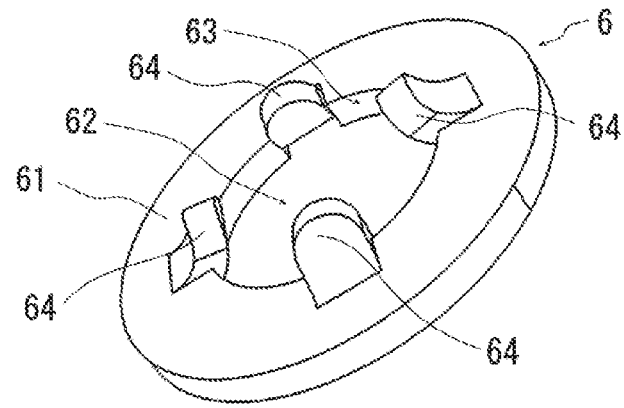
FIG. 7
(Prior Art)
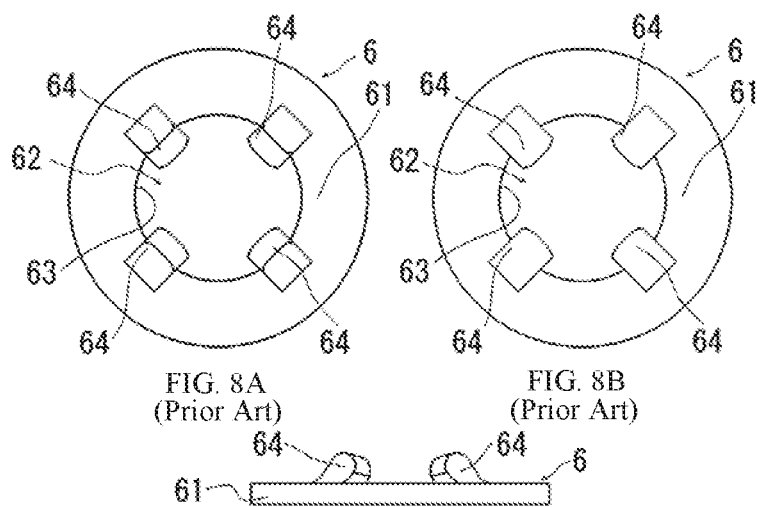
FIG. 8A
(Prior Art)
FIG. 8B
(Prior Art)
FIG. 8C
(Prior Art)

CHECK VALVE

TECHNICAL FIELD

The present invention relates to a check valve used in a fuel passage of a carburetor for the purpose of, for example, preventing reverse flow of fuel.

BACKGROUND TECHNOLOGY

Check valves that allow fluid to flow out in only one direction and prevent the reverse flow have been known in the past, and various types such as a ball type, swing type, lift type, and disk type according to the structure of a valve have been known. A purpose of the check valve is to prevent the reverse flow of fluid, and since overall the body is not complicated, such as the disk type, it can be provided at a low cost, is easily installed in the middle of a tubular body, and therefore it is suitable for disposing, for example, in a fuel passage of a carburetor or the like.

Further, a disk type check valve forms an inflow opening and an outflow opening by a casing as described in, for example, Japanese Unexamined Patent Application Nos. H10-288265 and H07-101066, and a ring-shaped valve seat is formed there between to dispose a disk-shaped valve body having a larger diameter than the outflow opening and a smaller diameter than the valve seat, that is biased in the outflow opening direction by a coil spring. When the fluid flows in from the inflow opening at a pressure exceeding the biasing force of the coil spring, the valve body slides in the outflow opening direction by a large pressing force larger than the biasing force of the coil spring acting on the valve body so that the fluid that is coming in from the inflow opening through a gap which is formed on the outer periphery of the valve body in the valve seat, flows out. Conversely, when the fluid reverse flows from the outflow opening direction, the valve body slides in the inflow opening direction by the biasing force of the coil spring to close the inflow opening so as to prevent the reverse flow of the fluid.

A check valve using a further simple disk-shaped valve body described in Japanese Unexamined Patent Application No. 2010-60110 has also been known. This check valve, as illustrated in FIG. 5A, is configured such that a valve body 332 and a valve seat 334 are inserted to attach in a valve holder 320, and assembled by engaging a projecting part 324 to a groove 338 of the valve body 332. With this check valve 330, as illustrated in FIG. 5B, the valve body 332 becomes an open state by abutting onto a valve stopper 326 made from a curved longitudinal beam member, and also becomes a close state by abutting the valve body 332 onto a valve seat 336 by reverse direction pressure.

Therefore, there is a large difference in the check valves described in Patent Application Nos. H10-288265 and H07-101066 in that an advantageous effect is exhibited with a simple structure without using means for pressing the valve body against the valve seat, for example, such as a coil spring.

Furthermore, a check valve illustrated in FIGS. 6A, 6B and 6C is a conventionally known check valve having a further simpler configuration than the check valve that exhibits the similar advantageous effect with a simple structure without using biasing means illustrated in FIGS. 5A and 5B. It is configured such that a case body 1 is made of, for example, aluminum die cast, with a cylindrical inflow opening 2 and an outflow opening 3 formed respectively in both ends, as well as a cylindrical valve seat 4, having a predetermined length, is formed in the axial direction between the inflow opening 2 and the outflow opening 3, a disk-shaped valve body 5 with an outer diameter having a slightly smaller diameter than the inner diameter of the valve seat 4 as well as a larger diameter than the inner diameter of the inflow opening 2, is disposed with an ability to move in the axial direction of the valve seat 4, and a support member (retainer) 6 of the valve body 5 that is disposed between the outflow opening 3 of the valve seat 4 and the valve body 5.

Moreover, the support member (retainer) 6 is configured as illustrated in FIGS. 7, 8A, 8B and 8C where a disc-shaped base seat 61 that forms an outflow window 62 in the center that is fit into a circular circumferential groove formed between the outflow opening 3 and the valve seat 4 as illustrated in FIGS. 6A, 6B and 6C, and support pieces 64 of the valve body 5 illustrated in FIGS. 6A, 6B and 6C that are provided in an upwardly projecting manner (the valve body 5 direction) in an open edge 63 of the outlet window 62 formed in the center of the base 61 are projected as illustrated in FIGS. 7, 8A, 8B and 8C.

Also, in a check valve according to the present embodiment, as illustrated in FIG. 6A, a predetermined gap 41 is formed between the top surface 43 of the valve seat 4 because the valve body 5 disposed in the valve seat 4 is pressed in the outflow opening 3 direction by the fluid normally entering from the inflow opening 2 to be supported by the support pieces 64 of the support member (retainer) 6.

Accordingly, the fluid entered from the inflow opening 2 flows towards the outflow opening 3 from the inflow window 62 of the support member (retainer) 6 via a space 42 formed between an inner peripheral surface 44 of the valve seat 4 and the support piece 64 from the gap 41.

When the flow of the fluid changes in this condition, in other words, when the fluid that has been flowing toward the outflow opening 3 flows in reverse and flows in the direction of the inflow opening 2, the open end 21 of the inflow opening 2 is closed by moving the valve body 5 in the axial direction within the valve seat 4 because the fluid that has been flowing toward the outflow opening 3 flows in reverse to operate the check valve. That is, as illustrated in FIG. 6B, the valve body 5 tightly contacts the open end 21 area of the inflow opening 2 of the valve seat 4 due to the fluid pressure of the reverse flow and the check valve becomes the close state.

Documents of the Related Art

Japanese Unexamined Patent Application No. H10-288265

Japanese Examined Patent Application No. H07-101066

Japanese Unexamined Patent Application No. 2010-60110

SUMMARY OF THE INVENTION

Problem to be Solved by the Invention

However, the conventionally known support member (retainer) 6 is, for example, machine pressed in a metal circular plate of an appropriate thickness and formed with support pieces 64 for supporting the center of the outflow window 62 and the valve body 5, and particularly, the tip ends of the support pieces 64 exhibit a horseshoe shape by bending the side surface upward, and as a result, the valve body 5, when releasing, supports the valve body 5 in a point contact state by respective tip ends of each support piece 64.

Accordingly, the valve body 5 is not supported by the support member (retainer) 6 in a stable state, and a protruding position of each support piece 64 on the support member (retainer) 6 is in a position separated from the inner circumferential surface 44 of the valve seat 4. That is, because there is a large range of play in the valve body, when a fluid is applied to the valve body 5 at a pressure biased, for example, in a direction toward the outflow opening 3 with respect to the installation direction, then the valve body will tilt to an angle where one end of the valve 5 is deeply inserted into a space 42 positioned between the inner circumferential surface 44 of the valve seat 4 and each of the support pieces 64 as shown in FIG. 6C. Therefore, the valve body 5 gets stuck due to the 3 points of contact with the inner circumferential surface 44 of the valve seat 4, each of the support pieces 64, and the top portion 43 of the valve seat 4, and as a result, there is a problem in that a state which inhibits the opening and closing action of the check valve is induced.

To resolve the above problem, an object of the present invention is to provide a check valve that can prevent sticking of a valve body and reliably perform an opening and closing action in a check vale having a simple structure and that does not use biasing means on the valve body as conventionally known.

Means for Solving the Problem

To resolve the above problems, the present invention is a check valve including: a case body in which a cylindrically shaped valve seat with a cylindrically shaped inflow opening and outlet opening formed respectively on each end and having an inner diameter larger than the inflow opening, and having a predetermined length in an axial direction formed between the inflow opening and the outlet opening; a disk shaped valve body having an outer diameter slightly smaller than the inner diameter of the valve seat and disposed with the ability to move in an axial direction of the valve seat by a larger diameter than the inner diameter of the outflow opening; a support member (retainer) of the valve body disposed between the valve body and the outlet opening of the valve seat; and a plurality of support pieces of the support member (retainer) protruded in the valve body direction on a disk shaped base seat are formed centrally on an open edge of an outflow window formed in the center of the base seat, where the support member (retainer) is inserted in a circular groove formed between the outflow opening and a valve seat; wherein each of the plurality of support pieces of the support member (retainer) supporting the valve body has a linear or planar support part on a top portion for leveling of the base seat at least in a radial direction.

Because each support piece of a support member (retainer) supporting a valve body has a linear or planar support part on the top portion for leveling at least in a radial direction of the base seat, the valve body, when in a released state, can be supported in a stable state to prevent the generation of chattering, can narrow the gap between the support part and the inner circumferential surface of the valve seat to reduce the space formed between the support piece, and can prevent sticking by the valve body by reducing the range of play in the valve body.

Further, in the present invention, when integrally forming the support member (retainer) from a plate member, each support piece forms a linear support part on the top portion for leveling at least in a radial direction of the base seat by raising the support piece so as to face in a direction to intersect a direction toward a center point instead of the method of raising a support piece toward a center point used conventionally.

Effect of the Invention

With the present invention, not only can a support member (retainer) be formed from the same material and process as used conventionally, but because the valve body can be prevented from sticking, a check valve having higher reliability can be provided in a simple structure similar to that used conventionally.

Moreover, in contrast to the support member (retainer) in the conventional technique where contact with the valve body is in point contact because the contact location with the valve body, i.e. the protruding top portion, is a curved surface, the support member (retainer) of the present invention includes a flat protruding top portion as the contact location with the valve body, and therefore, contact with the valve body is planar contact which enables stability when holding the valve body.

Therefore, the valve body can move vertically while remaining parallel to the valve seat, and in performing that function, achieve an excellent effect not available conventionally.

BRIEF DESCRIPTION OF THE DRAWINGS

FIGS. 3A, 3B and 3C illustrate the support member shown in FIG. 2, while FIG. 3A is a top view, FIG. 3B is a bottom view, and FIG. 3C is a side view.

FIGS. 4A and 4B illustrate a different support member used in the embodiment illustrated in FIGS. 1A, 1B and 1C, while FIG. 4A is a top view and FIG. 4B is a vertical cross-sectional view.

FIGS. 5A and 5B are a cross-sectional views of a state of use of the check valve of the conventional technique described in Japanese Unexamined Patent Application No. 2010-60110.

FIGS. 6A, 6B and 6C are vertical cross-sectional views illustrating the conventional example.

FIG. 7 is a perspective view illustrating a support member used in the conventional example illustrated in FIGS. 6A, 6B and 6C.

FIGS. 8A, 8B and 8C illustrate the support member shown in FIG. 7, while FIG. 8A is a top view, FIG. 8B is a bottom view, and FIG. 8C is a side view.

DESCRIPTION OF THE PREFERRED EMBODIMENT

Next, a preferred embodiment of the present invention will be described with reference to drawings.

Figures 1A, 1B:
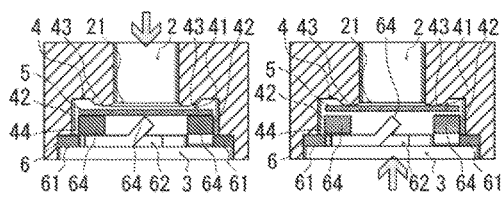
FIGS. 1A, 1B and 1C illustrate vertical cross-sectional views of a check valve according to a preferred embodiment of the present invention.
Figure 1C:
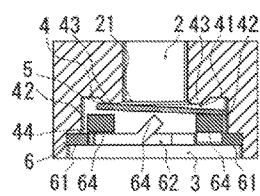

FIGS. 1A, 1B and 1C illustrate vertical cross-sectional views of a preferred embodiment of a check valve which is the present invention. The overall configuration is substantially similar to that of the conventional technique shown in FIGS. 6A, 6B and 6C and is configured in that an inflow opening 2 and an outflow opening 3 are formed in a cylindrical shape on both ends, respectively, and include: a case body 1 made of, for example, an aluminum die cast forming a cylindrically shaped valve seat 4 having a predetermined length in an axial direction between the inflow opening 2 and the outflow opening 3; a disk shaped valve body 5 having an outer diameter slightly smaller than the inner diameter of the valve seat 4 and disposed with the ability to move in an axial direction of the valve seat 4 by a larger diameter than the inner diameter of the inflow opening 2; and a support member (retainer) 6 of the valve body 5 disposed between the outflow opening 3 of the valve seat 4 and the valve body 5.

Figure 2:
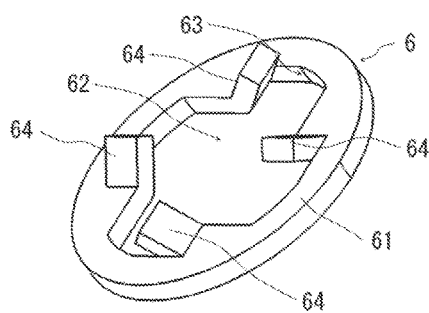
FIG. 2 is a perspective view illustrating a support member used in the embodiment illustrated in FIGS. 1A, 1B and 1C.
Figures 3A, 3B:
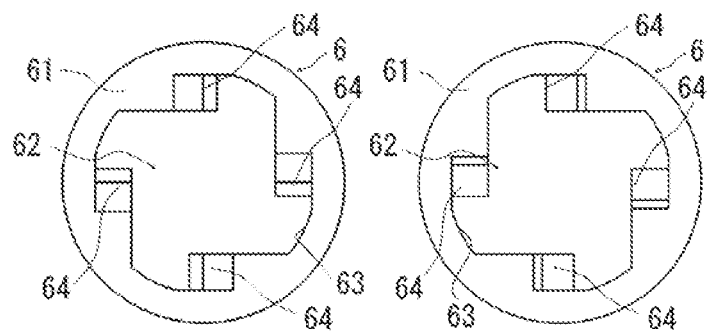
Figure 3C:
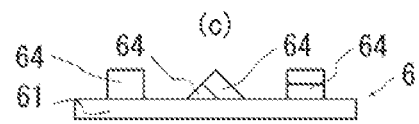

Further, the support member (retainer) 6, as illustrated in FIGS. 2 and 3, is provided with protruding support pieces 64 on the support member (retainer) 6 shown in FIG. 1 protruding upward (valve body 5 direction) standing (90°)in this embodiment) at mutually equivalent angles from the center on a circular plate shaped base seat 61 forming an outflow window 62 in the center on an open edge 63 of the outflow window 62 formed in the center of the base seat 61 and inserted in a circular groove formed between the valve seat 4 and the outflow opening 3 of the check valve shown in FIG. 1.

Further, with the support member (retainer) 6 as illustrated in FIGS. 2, 3A, 3B and 3C, each support piece 64 of the support member (retainer) 6 supporting the valve body 5 has a linear (or planar) support part on the top portion for leveling at least in a radial direction of the base seat 61.

Note that, the support member (retainer) 6 in this embodiment, similar to the embodiment shown in FIGS. 7, 8A, 8B and 8C, has support pieces 64 to support the valve body 5, formed by being cut out, on the open edge 63 of the outflow window 62 of the circular base seat 61 having a fluid outflow window 62 with a predetermined diameter in the center formed by, for example, punching a metal plate such as brass or the like having an appropriate thickness, and the support pieces 64 are erected by bending in an intersecting direction with the base seat 61. Particularly, because the support pieces 64 are raised in a direction to intersect with a radial direction of the base seat 61 rather than in the radial direction, the support pieces 64 have a linear (or planar) support part on the top portion for leveling at least in a radial direction of the base seat 61.

This embodiment using the support member (retainer) 6 configured in this manner, as shown in FIG. 1A, is supported by the support pieces 64 of the support member (retainer) 6 by fluid flowing in from the inflow opening 2 pressing the valve body 5 disposed in the valve seat 4 in a direction toward the outflow opening 3 and flowing out to the outflow opening 3 from the outflow window 62 of the support member (retainer) 6 via the space 42 formed between the support pieces 64 and the inner circumferential surface 44 of the valve seat 4 from the gap 41 formed with the top surface 43 of the valve seat 4.

At this time, in this embodiment, the support piece 64 of the support member (retainer) 6 is in a shape that extends in the radial direction of the base seat 61, and instead of point contact against the valve body 5 as in the conventionally known check valve shown in FIGS. 6A, 6B and 6C, it supports the valve body 5 with at least linear contact such that the valve body 5 does not deflect and can move oscillating in an axial direction in an extremely stable disposition reliably in the valve seat 4 thereby preventing tilt and deflection by the valve body 5.

Further, in this embodiment, as illustrated in FIG. 1B, when fluid having flowed through the outflow opening 3 flows in reverse to flow toward the inflow opening 2, the check valve operates so that the fluid having flowed toward the outflow opening 3 flows in reverse through the valve seat 4 and moves the valve body 5 in an axial direction in the valve seat 4 to block the open end 21 of the inflow opening 2, which is to say, that the check valve is put in a closed state by the valve body 5 tightly contacting the open end 21 area of the inflow opening 2 of the valve seat 4 by the fluid pressure of the reverse flowing fluid, and because also at this time, the valve body 5 is supported by the support member (retainer) 6 in a stable state in advance prior to the reverse flow, even if there is a reverse flow, the valve body 5 moves toward the inflow opening 2 direction in a state still retaining a flat disposition.

Moreover, as illustrated in FIG. 1C, with this embodiment, the space 43 formed between each support piece 64 of the support member 6 and the inner circumferential surface 44 of the valve seat 4 is formed narrower than the conventionally known check valve shown in FIGS. 6A, 6B and 6C, and therefore, the range of play in the valve body 5 is reduced and sticking, as in the conventionally known check valve, does not occur even if the valve body 5 tilts for some reason while open.

Figures 4A, 4B:
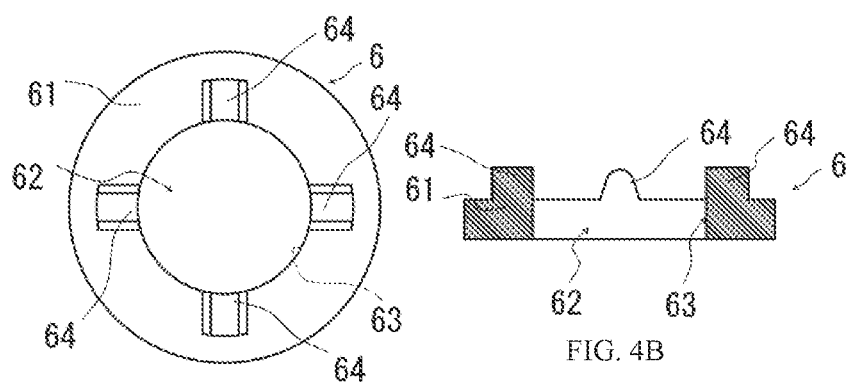

In addition, FIGS. 4A and 4B illustrate a different embodiment of the support member (retainer) 6 used in the embodiment of the present invention, and in this embodiment, the entirety of the support member (retainer) 6 is formed of, for example, injection molding using a hard synthetic resin material, and because this does not require a step to machine fold the support member, working is easier and a more stable item can be provided. Particularly, it is possible to form the support part of the support piece 64 flat with a wider width than the thickness of the material different than in the previous example to thereby employ a more stable support member (retainer) 6.

In this manner, the support member (retainer) 6 used in the embodiments is not limited in material or method of manufacture, and as long as the support piece 64 erected on the base seat 61 is formed in a linear or planar shape having a length in a radial direction to the base seat 61, the effect can be demonstrated.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

DESCRIPTION OF THE REFERENCE NUMERALS 1 case body
2 inflow opening
3 outlet opening
4 valve seat
5 valve body
6 support member (retainer)
21 open end
41 gap
42 space
43 top portion
44 inner circumferential surface
61 base seat
62 outflow window
63 open edge
64 support piece

What is claimed is:

1. A check valve comprising:
a case body in which a cylindrically shaped valve seat with a cylindrically shaped inflow opening and outlet opening formed respectively on each end, having an inner diameter larger than the inflow opening and having a predetermined length in an axial direction formed between the inflow opening and the outlet opening;
a disk shaped valve body having an outer diameter slightly smaller than the inner diameter of the valve seat and disposed with the ability to move in an axial direction of the valve seat within the inner diameter of the valve seat;
a support member of the valve body disposed between the valve body and the outflow opening of the valve seat; and
a plurality of support pieces of the support member protrude from a disk shaped base seat of the support member in a valve body direction and are formed centrally on an open edge of an outflow window formed in the center of the base seat, wherein the support member is inserted in a circular groove formed between the outflow opening and the valve seat;
wherein each of the plurality of support pieces of the support member supporting the valve body has a linear or planar support part on a top portion for linearly leveling the valve body at least in a radial direction, wherein the linear or planar support part of each of the plurality of support pieces of the support member extends in a radial direction of the base seat, and wherein the linear or planar support part of each of the plurality of support pieces of the support member extends from the open edge of the outflow window to a location adjacent to an inner circumferential surface of the inner diameter of the valve seat.

2. The check valve according to claim 1, wherein each of the plurality of support pieces being integrally formed with the base seat from a plate member by raising each of the plurality of support pieces in a direction to intersect the linear or planar support part with a direction toward a center point of the base seat.

3. The check valve according to claim 1, wherein the linear or planar support part of each of the plurality of support pieces of the support member extends beyond an outer perimeter of the valve body.

* * * * *